（12）United States Patent
Lee et al.

(10) Patent No.: US 7,830,478 B2
(45) Date of Patent: Nov. 9, 2010

(54) DISPLAY PANEL AND LIQUID CRYSTAL DISPLAY DEVICE HAVING THE SAME

(75) Inventors: Eung-Sang Lee, Seoul (KR); Ho-Jung Lee, Suwon-si (KR); Akira Hirai, Seongnam-si (KR); Bong-Ju Kim, Kyungki-do (KR); Yong-Je Jeon, Suwon-si (KR); Sang-Woo Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 689 days.

(21) Appl. No.: 11/125,669

(22) Filed: May 10, 2005

(65) Prior Publication Data

US 2005/0248703 A1 Nov. 10, 2005

(30) Foreign Application Priority Data

May 10, 2004 (KR) .................. 10-2004-0032643
Nov. 2, 2004 (KR) .................. 10-2004-0088309

(51) Int. Cl.
*G02F 1/1335* (2006.01)

(52) U.S. Cl. ...................................... 349/114; 349/106

(58) Field of Classification Search ................. 349/106, 349/114

See application file for complete search history.

(56) References Cited

U.S. PATENT DOCUMENTS

| 7,167,223 | B2 * | 1/2007 | Tanaka et al. | 349/114 |
| 2002/0003596 | A1 * | 1/2002 | Kim | 349/106 |
| 2002/0149722 | A1 | 10/2002 | Anno et al. | 349/113 |
| 2002/0176029 | A1 | 11/2002 | Fujino | 349/43 |

(Continued)

FOREIGN PATENT DOCUMENTS

CN 1410812 4/2003

(Continued)

OTHER PUBLICATIONS

"Development of "Adavanced TFT-LCD" with good legibility under any ambient light intensity"; Authors: Masumi Kubo, et al.; Journal of the Society for Information Display, vol. 8, No. 4; pp. 299-304 (2000).

(Continued)

*Primary Examiner*—David Nelms
*Assistant Examiner*—Nathanael R Briggs
(74) *Attorney, Agent, or Firm*—Cantor Colburn LLP

(57) ABSTRACT

An LCD device includes a lower panel having a first substrate; an organic layer formed on the first substrate; a trans-reflection layer formed on the organic layer and having a reflection area reflecting a portion of incidence light from exterior and a transmission area transmitting other portion of the incidence light; color filters formed on the trans-reflection layer; an overcoating layer formed on the color filters; and a common electrode formed on the overcoating layer. A portion of the overcoating layer corresponding to the reflection area is thicker than a portion of the overcoating layer corresponding to the transmission area. The LCD device also includes an upper panel including a second substrate facing the first substrate with a predetermined gap; thin film transistors formed on the second substrate; and pixel electrodes connected to the thin film transistors; and a liquid crystal layer disposed between the lower and upper panels.

13 Claims, 7 Drawing Sheets

U.S. PATENT DOCUMENTS

| | | | |
|---|---|---|---|
| 2003/0086036 A1* | 5/2003 | Yang et al. | 349/113 |
| 2003/0160914 A1 | 8/2003 | Ha | 349/106 |
| 2003/0160918 A1* | 8/2003 | Rho | 349/113 |
| 2004/0189903 A1* | 9/2004 | Yoshii et al. | 349/114 |
| 2004/0196421 A1* | 10/2004 | Hwang | 349/114 |
| 2004/0201804 A1* | 10/2004 | Ting et al. | 349/114 |

FOREIGN PATENT DOCUMENTS

| | | |
|---|---|---|
| JP | 2000-098371 A | 4/2000 |
| JP | 2001-242452 A | 9/2001 |
| JP | 2004029400 | 1/2004 |

OTHER PUBLICATIONS

European Search Report for Application No. 05103891.7-2205; Dated: Feb. 15, 2006.

* cited by examiner

DISPLAY PANEL AND LIQUID CRYSTAL DISPLAY DEVICE HAVING THE SAME

BACKGROUND OF THE INVENTION (a) Field of the Invention

The present disclosure relates to a display panel and a liquid crystal display (LCD) device having the same.

(b) Description of the Related Art

A liquid crystal display (LCD) device is one of the most widely used flat panel display devices. An LCD device includes two panels provided with field-generating electrodes, and a liquid crystal (LC) layer interposed therebetween. The LCD device displays images by applying voltages to the field-generating electrodes to generate an electric field in the LC layer, which determines orientations of LC molecules in the LC layer to adjust polarization of incident light.

Generally, an LCD device includes a pair of panels individually having electrodes on their inner surfaces. The first panel includes a plurality of pixel electrodes arranged in a matrix type and the second panel includes a common electrode corresponding to all the pixel electrodes. Desired images are obtained by controlling the voltage difference between the electrodes. For controlling the voltage difference between the electrodes, thin film transistors (TFT's) connected to the pixel electrodes to switch pixel voltages, gate lines transmitting scanning signals, and data lines transmitting image signals are formed on the first panel.

LCD devices are classified into a transmission type LCD and a reflection type LCD according to the light source. The transmission type LCD devices have a backlight as the light source. The reflection type LCD devices use external light as the light source. Trans-reflective type LCD devices which use both a backlight and external light as the light source have been also under development.

In a trans-reflective type LCD device, a panel requires an organic insulating layer and reflectors which are formed by separate processes. For this reason, a manufacturing method of the trans-reflective type LCD devices includes more steps than that of the transmission type LCD devices. Accordingly, the conventional trans-reflective type LCD devices require more manufacturing cost and tact time than the transmission type LCD devices.

SUMMARY OF THE INVENTION

A trans-reflective LCD as will be described herein takes less manufacturing cost and tact time than the manufacture of a conventional trans-reflective LCD.

In one embodiment, a panel for an LCD includes a substrate; an organic layer formed on the substrate; a trans-reflection layer formed on the organic layer and having a reflection area reflecting a portion of incidence light from an exterior of the panel and a transmission area transmitting another portion of the incidence light; color filters formed on the trans-reflection layer; an overcoating layer formed on the color filters; and a common electrode formed on the overcoating layer, wherein a thickness of a portion of the overcoating layer corresponding to the reflection area is greater than that of the portion of the overcoating layer corresponding to the transmission area.

The overcoating layer may be disposed at least on the portion of the trans-reflective layer corresponding to the reflection area. The trans-reflection layer may be made of aluminum or chromium.

The panel for an LCD may further comprise an adhesion layer disposed between the overcoating layer and the common electrode.

The organic layer may have an embossed surface. The color filters may have light holes.

An embodiment of the LCD includes a first panel having a first substrate; an organic layer formed on the first substrate; a trans-reflection layer formed on the organic layer and having a reflection area reflecting a portion of incidence light from an exterior of the LCD and a transmission area transmitting another portion of the incidence light; color filters formed on the trans-reflection layer; an overcoating layer formed on the color filters wherein a thickness of a portion of the overcoating layer corresponding to the reflection area is greater than that of a portion of the overcoating layer corresponding to the transmission area; and a common electrode formed on the overcoating layer; a second panel including a second substrate, the second panel separated from the first with the first panel by a gap; a plurality of thin film transistors formed on the second substrate; and a plurality of pixel electrodes connected to the thin film transistors; and a liquid crystal layer disposed between the first panel and the second panel.

The overcoating layer may be disposed at least on the portion of the trans-reflective layer corresponding to the reflection area. The gap within the transmission area may be larger than that of the reflection area.

In another embodiment, a panel for an LCD includes a substrate; an organic layer formed on the substrate; a trans-reflection layer formed on the organic layer and having a reflection area reflecting a portion of incidence light from an exterior of the panel and a transmission area transmitting another portion of the incidence light; color filters formed on the trans-reflection layer; and a common electrode formed on the color filters, wherein a thickness of a portion of the organic layer corresponding to the reflection area is thicker than that of a portion of the organic layer corresponding to the transmission area.

The organic layer may be disposed at least on the substrate within an area corresponding to the reflection area. The trans-reflection layer may be made of aluminum or chromium. The organic layer may have an embossed surface. The color filters may have light holes.

In another embodiment, a manufacturing method of a panel for an LCD includes forming an organic layer on a substrate; embossing the surface of the organic layer; forming a reflection layer on the organic layer; removing a portion of the reflection layer by using a photo-etching process to form a trans-reflection layer; and removing a portion of the organic layer exposed through the removed portion of the reflection layer.

The removed portion of the reflection layer and the removed portion of the organic layer may correspond to a transmission area.

The method may further comprise forming color filters on the trans-reflection layer; and a common electrode formed on the color filters.

In yet another embodiment, an LCD includes a first panel having a first substrate; an organic layer formed on the first substrate; a trans-reflection layer formed on the organic layer and having a reflection area reflecting a portion of incidence light from an exterior of the first panel and a transmission area transmitting another portion of the incidence light; color filters formed on the trans-reflection layer; and a common electrode formed on the color filters; a second panel including a second substrate facing the first substrate; a plurality of thin film transistors formed on the second substrate; and a plurality of pixel electrodes connected to the thin film transistors; and a liquid crystal layer disposed between the first panel and the second panel, wherein the second panel is separated from the first panel by a selected gap, and a thickness of a portion of the organic layer corresponding to the reflection area is greater than that of a portion of the organic layer corresponding to the transmission area.

The organic layer may be disposed at least on the portion of the substrate within an area corresponding to the reflection area. The gap within the transmission area may be larger than that within the reflection area.

In another embodiment, a panel for an LCD includes a reflection area for reflecting within the panel a portion of incidence light from an exterior of the panel, a transmission area for transmitting through the panel another portion of the incidence light, a substrate, and a stepped layer on the substrate, the stepped layer allowing the passage of the incidence light therethrough, wherein the stepped layer has a first thickness within the reflection area, and a second thickness within the transmission area, and wherein the first thickness is greater than the second thickness.

In another embodiment, an LCD includes a first panel, a second panel, the second panel separated from the first panel by a gap, a reflection area for reflecting within the first and second panels a portion of incidence light from an exterior of the first and second panels, and a transmission area for transmitting through the first and second panels another portion of the incidence light, wherein the gap has a first thickness within the reflection area and a second thickness within the transmission area, wherein the first thickness is less than the second thickness.

BRIEF DESCRIPTION OF THE DRAWINGS

Exemplary embodiments of the present invention can be understood in more detail from the following descriptions taken in conjunction with the accompanying drawings, in which.

DETAILED DESCRIPTION OF THE INVENTION

Figure 1:
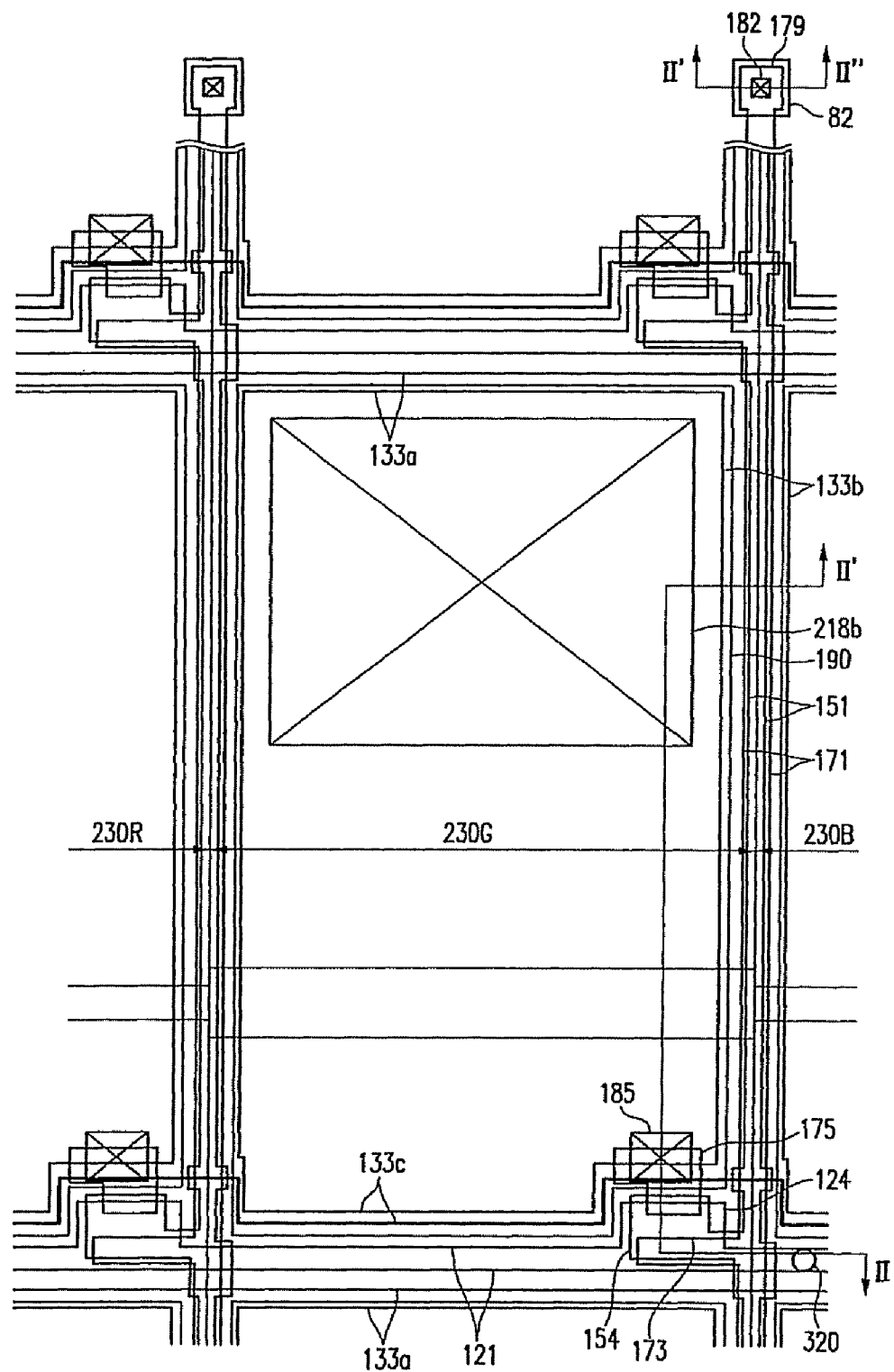
FIG. 1 is a layout view of a trans-reflective LCD device according to an embodiment of the present invention.

Exemplary embodiments of the present invention now will be described more fully hereinafter with reference to the accompanying drawings, in which exemplary embodiments of the invention are shown. The present invention may, however, be embodied in different forms and should not be construed as being limited to the embodiments set forth herein. Rather, these embodiments are provided so that this disclosure will be thorough and complete, and will fully convey the scope of the invention to those skilled in the art.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

Hereinafter, a display panel and a trans-reflective LCD device according to an embodiment of the present invention will be described with reference to the drawings.

Figure 2:
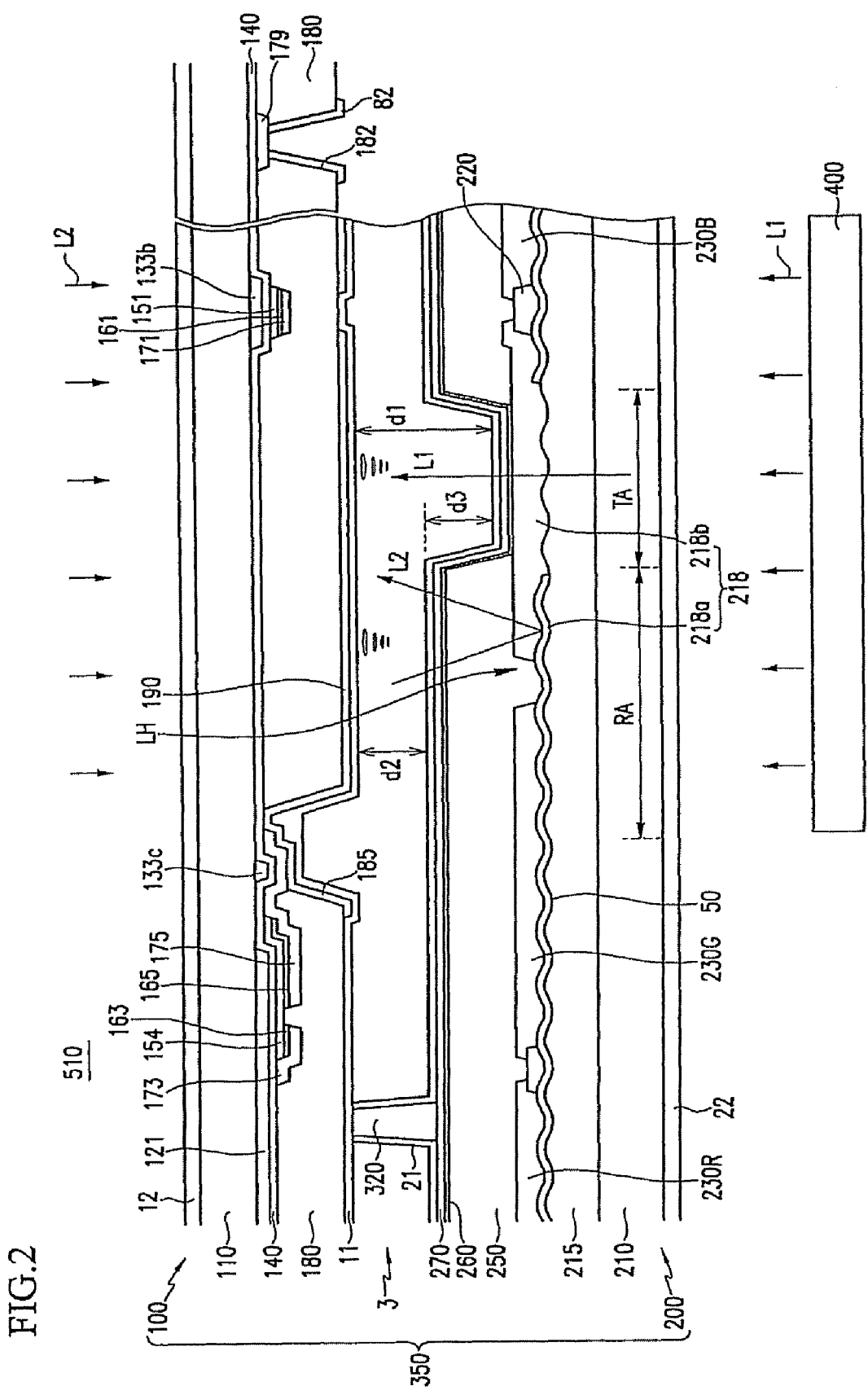
FIG. 2 is a sectional view of the trans-reflective LCD device taken along line II-II' and line II'-II" of FIG. 1.

FIG. 1 is a layout view of a trans-reflective LCD device according to an embodiment of the present invention. FIG. 2 is a sectional view of the trans-reflective LCD device taken along line II-II' and line II'-II" of FIG. 1. The illustrated embodiments include, in part, a liquid crystal layer 3, an embossing 50, an organic layer 215, a trans-reflection layer 218, and an overcoating layer 250.

As shown FIGS. 1 and 2, a trans-reflective LCD device according to an embodiment of the present invention includes a back light 400 generating a first light L1 and a liquid crystal (LC) panel 350 that displays images by using the first light L1 or second light L2 provided from an exterior of the LC panel 350. The trans-reflective LCD device also includes a first polarizing film 22 disposed under the lower panel 200 and polarizing the first light L1 from the back light 400 and a second polarizing film 12 disposed on the upper panel 100 and polarizing the first and second lights L1 and L2.

The LC panel 350 includes the upper panel 100, the lower panel 200 facing the upper panel 100, and a liquid crystal layer 3 disposed between the two panels 100 and 200. The lower and upper panels 100 and 200 are spaced from each other by a predetermined gap (or a cell gap d2).

The lower panel 200 includes a lower substrate 210 made of glass and an organic layer 215 (diffuser layer) formed on the lower substrate 210. While the lower substrate 200 is exemplararily described as glass, it should be understood that alternate materials having equivalent properties would also be within the scope of this trans-reflective LCD device. Similarly, while layer 215 is described as organic, alternate materials having equivalent properties, either known or those yet to be discovered, would be within the scope of this trans-reflective LCD device. Here, the organic layer 215 has a surface of embossing 50 which may be formed by a single photolithography process to disperse direction of reflected light. A trans-reflection layer 218 is formed on the organic layer 215. Thus, the organic layer 215 includes a surface facing the lower substrate 210 and an opposite surface facing towards the upper panel 100 and the trans-reflection layer 218, and the surface of embossing 50 is formed on the surface of the organic layer 215 that is facing in the direction of the upper panel 100 and the trans-reflection layer 218. The embossing 50 of the organic layer 215 is transcribed to a reflection layer 218a of the trans-reflection layer 218 to disperse direction of reflected light.

The trans-reflection layer 218 includes the reflection layer 218a made of a reflective material and reflecting the second light L2 coming from a front of the upper panel 100 and a transmission layer 218b transmitting the first light L1. By a "front" of the upper panel 100, it should be understood that this refers to a side of the upper panel facing an exterior of the LC panel 350. Thus, the second light L2 enters the LC panel 350 through the upper panel 100 in a direction pointing from the upper panel 100 to the lower panel 200, and the first light L1 enters the LC panel 350 through the second panel 200 in a direction pointing from the second panel 200 to the first panel 100. The reflection layer 218a is made of a metal such as, but not limited to, chromium (Cr) or aluminum (Al). Here, the lower panel 200 includes a reflection area RA corresponding to the reflection layer 218a and a transmission area TA corresponding to the transmission layer 218b.

A light blocking member 220 is formed on the trans-reflection layer 218 to prevent light leakage. The light blocking member 220 has a plurality of openings corresponding to pixel electrodes 190 and has a similar shape as the pixel electrodes 190. The light blocking member 220 preferably includes portions corresponding to the thin film transistors and may have a shape of stripes along the data lines 171.

The light blocking member 220 may be a Cr single layer, Cr and chromium dioxide ($CrO_2$) double layers, an organic layer including black pigments, etc.

Red, green, and blue color filters 230R, 230G, and 230B are formed on the trans-reflective layer 218. The color filters 230R, 230G, and 230B correspond to the pixel electrodes 190 and have shapes of stripes stretching to the longitudinal direction. Each of the color filters 230R, 230G, and 230B expresses a primary color among red, green, and blue. Boundaries of the color filters 230R, 230G, and 230B are disposed on the gate lines or the data lines. The light blocking member 220 is disposed to correspond to the boundaries of the color filters 230R, 230G, and 230B for preventing color mixing between two adjacent pixels to enhance reproduction of color.

The color filters 230R, 230G, and 230B respectively have light holes LH to compensate for the difference of light passing between the transmission area TA and the reflection area RA.

In the reflection area RA, the second light L2 comes into the reflection layer 218a through the color filters 230R, 230G, and 230B and goes out from the reflection layer 218a through the color filters 230R, 230G, and 230B after reflection, as exemplified by the reflected arrow in FIG. 2. In the transmission area TA, the first light L1 from the back light 400 just passes out through the 230R, 230G, and 230B. Accordingly, the light passage of the second light L2 is two times longer than that of the first light L1. Such difference of light passage induces difference of light chroma. To compensate for the difference of light chroma, light holes LH are formed in the reflection area RA.

Here, since the green has higher visibility than the blue and red, the light hole LH formed in the green color filter 230G is wider than the light holes LH formed on the blue color filter 230B and red color filter 230R. However, the light holes LH may have same size and the visibility difference may be adjusted by differentiating the number of the light holes LH among the red, green, and blue color filters 230R, 230G, and 230B.

An overcoating layer 250 is formed on the color filters 230R, 230G, and 230B and the light blocking member 220 to prevent the color filters 230R, 230G, and 230B from being exposed to the liquid crystal layer 3 and to make a flat surface.

The portion corresponding to the transmission area TA of the overcoating layer 250 may have a thinner width than the portion corresponding to the reflection area RA. The portion of the overcoating layer 250 corresponding to the transmission area TA may also be omitted.

For example, the thickness d3 of the overcoating layer 250 corresponding to the reflection area RA is about 1.5 times to about 2.5 times thicker than that of the portion corresponding to the transmission area TA. While a specific proportional range has been described for the relative thickness between the portion of the overcoating layer 250 corresponding to the reflection area and the portion of the overcoating layer 250 corresponding to the transmission area, it should be understood that alternate proportions would be within the scope of this trans-reflective LCD. Accordingly, the cell gap d2 within the reflection area RA is smaller than the cell gap d1 within the transmission area TA. Here, the cell gaps d1 and d2 are defined as distances between the pixel electrode 190 and the common electrode 270.

Since the reflection layer 218a is not formed within the transmission area TA, the first light L1 from the back light 400 transmits through the transmission area TA to display images. That is, the first light L1 emitted from the back light 400 passes the LC layer 3 and color filters 230R, 230G, and 230B just once to display images. In other words, the first light L1 that enters the LC panel 350 through the lower panel 200 within the transmission area TA passes through the color filters 230R, 230G, and 230B and the LC layer 3, and is not reflected back through the color filters 230R, 230G, and 230B and the LC layer 3.

On the contrary, the first light L1 from the back light 400 does not enter into the LC layer 3 within the reflection area RA, because the reflection layer 218a reflects the first light L1. However, the second light L2 coming from the exterior through the upper panel 100 is reflected back to the front side of the upper panel 100 to display images. In the reflection area RA, the second light L2 passes the color filters 230R, 230G, and 230B and the LC layer 3 twice, that is, both coming into the LC panel 350 and going out of the LC panel 350. Accordingly, the second light L2 leaving the reflection area RA experiences phase retardation since it has passed through the LC layer 3 twice and sometimes experiences inversion of phase at the reflection layer 218a.

As described above, since the portion corresponding to the transmission area TA of the overcoating layer 250 has a thinner width than the portion corresponding to the reflection area RA, the cell gap d2 within the reflection area RA is smaller than the cell gap d1 within the transmission area TA. Thus, the phase retardation of light in the transmission area TA and the reflection area RA can be adjusted to be the same by controlling the thickness of the overcoating layer 250. By the above method, an LCD device having uniform color reproduction in both the areas TA and RA can be made.

Accordingly, a trans-reflective type LCD device which has no phase difference between the first light L1 and the second light L2 without phase shifting films can be made.

A common electrode 270 made of a transparent conductor such as, but not limited to, Indium tin oxide (ITO) or Indium zinc oxide (IZO) is formed on the overcoating layer 250.

An alignment layer 21 is formed on the common electrode layer 270 and is rubbed in a direction to align the LC.

An adhesion layer 260 made of, for example, silicon dioxide ($SiO_2$) is formed between the overcoating layer 250 and the common electrode 270 to enhance adhesion between the overcoating layer 250 and the common electrode 270.

Column spacers 320 are formed on the common electrode 270 for a uniform cell gap between certain areas of the upper panel 100 and the lower panel 200. Alternatively, the column spacers 320 may be formed on the pixel electrodes 190 of the upper panel 100. The column spacers 320 may be formed to correspond to the thin film transistors. The number of column spacers 320 may be adjusted according to the size of the LCD device.

The LC layer 3 is made of, but not limited to, twist nematic (TN) LC, where the LC molecules are made to twist in one direction allowing for light to not scatter, thereby allowing the LCD device displays to have a better contrast.

The upper panel 100 includes a plurality of gate lines 121 and a plurality of storage electrode lines 133a formed on an insulating substrate 110. The gate lines 121 extend substantially in a transverse direction, that is, substantially perpendicular to data lines 171, and are separated from each other. The gate lines 121 transmit gate signals. A plurality of projections of each gate line 121 forms a plurality of gate electrodes 124. Each gate line 121 has an expansion for contact with another layer or an external device.

Each storage electrode line 133a extends substantially in the transverse direction, substantially parallel to the gate lines 121, and includes a plurality of sets of storage electrodes 133b and 133c including longitudinal storage electrodes 133b and transverse storage electrodes 133c connected to the longitudinal storage electrodes 133b. Alternatively, the storage electrode line 133a need not have the storage electrodes 133b and 133c and may be reformed in various forms.

The gate lines 121 as well as the storage electrode lines 133a may include a lower film and an upper film. The lower film and the upper film may have different physical characteristics. For example, the upper film is made of, but not limited to, a low resistivity metal including an aluminum (Al) containing metal such as Al and Al alloy for reducing signal delay or voltage drop in the gate lines 121 and the storage electrode lines 133a. On the other hand, the lower film is, for example, made of material such as, but not limited to, chromium (Cr), titanium (Ti), tantalum (Ta), molybdenum (Mo), and Mo alloy such as molybdenum-tungsten (MoW), which has good contact characteristics with other materials such as indium tin oxide (ITO) or indium zinc oxide (IZO). A good exemplary combination of the lower film material and the upper film material is Mo and aluminum-neodymium (Al—Nd) alloy.

In various exemplary embodiments of the invention, the gate lines 121 and the storage electrode lines 133a may have a single layered or multi-layered (i.e., triple or more layered) structure.

In this embodiment, a gate insulating layer 140 is made of silicon nitride (SiNx) is formed on the gate lines 121 and the storage electrode lines 133a.

A plurality of semiconductor stripes 151 made of, for example, hydrogenated amorphous silicon ("a-Si") is formed on the gate insulating layer 140. Each semiconductor stripe 151 extends substantially in the longitudinal direction, parallel with the data lines 171. Each semiconductor stripe 151 has a plurality of projections 154 branched out toward the gate electrodes 124. The width of each semiconductor stripe 151 becomes large near the gate lines 121 such that the semiconductor stripe 151 covers large areas of the gate lines 121.

A plurality of ohmic contact stripes and islands 161 and 165 made of, for example, silicide or n+ hydrogenated a-Si heavily doped with n type impurity are formed on the semiconductor stripes 151. Each ohmic contact stripe 161 has a plurality of projections, and the projections 163 and the ohmic contact islands 165 are located in pairs on the projections 154 of the semiconductor stripes 151.

The edge surfaces of the semiconductor stripes 151 and the ohmic contacts 161 and 165 may be tapered to provide a good adhesion with an upper layer.

A plurality of data lines 171 and a plurality of drain electrodes 175 are formed on the ohmic contacts 161 and 165 and the gate insulating layer 140.

The data lines 171 for transmitting data voltages extend substantially in a longitudinal direction, such as substantially parallel to the semiconductor stripes 151, and intersect the gate lines 121.

Each data line 171 has a plurality of source electrodes 173 of TFTs, which extend toward the drain electrodes 175. The source electrode 173 and drain electrode 175 make a pair. The source electrode 173 and drain electrode 175 of each pair are separated from each other and are located opposite to each other with respect to the gate electrode 124.

Each set of a gate electrode 124, a source electrode 173, and a drain electrode 175 along with a protrusion 154 of a semiconductor stripe 151 forms a TFT, and a channel of TFT is formed in the protrusion 154 between the source electrode 173 and the drain electrode 175.

Similar to the gate lines 121 and the storage electrode lines 133a, the data lines 171 and the drain electrodes 175 may include a lower film and an upper film, with the lower film and the upper film having different physical characteristics. The upper film is made of, but not limited to, low resistivity metal including Al containing metal such as Al and Al alloy for reducing signal delay or voltage drop in the data lines 171 and the drain electrodes 175. On the other hand, the lower film is made of material such as, but not limited to, Cr, Ti, Ta, Mo, and Mo alloy such as MoW, which has good contact characteristics with other materials such as indium tin oxide (ITO) or indium zinc oxide (IZO). A good exemplary combination of the lower film material and the upper film material is Mo and Al—Nd alloy.

The ohmic contacts 161 and 165 are interposed only between the underlying semiconductor stripes 151 and the overlying data lines 171 and drain electrodes 175 to reduce the contact resistance therebetween.

The semiconductor stripes 151 have exposed portions, which are not covered with the data lines 171 and the drain electrodes 175, such as portions located between the source electrodes 173 and the drain electrodes 175. The semiconductor stripes 151 have a narrower width than the data lines 171 in most places but, as explained before, the semiconductor stripes 151 have a wider width around the gate lines 121 and storage electrode lines 133a, thereby preventing disconnection of the data lines 171.

A passivation layer 180, where active broken bonds at the semiconductor surface are saturated, and hence de-activated, by reaction with a selected element, is formed on the data lines 171, the drain electrodes 175, and exposed portions of the semiconductor stripes 151. The passivation layer 180 is made of an organic material having a good flatness characteristic. The passivation layer 180 may be made of photosensitive organic material.

The passivation layer 180 may further include an insulating layer made of silicon nitride to prevent direct contact between the semiconductor 151 and the organic material.

The passivation layer 180 has a plurality of contact holes 185 and 182 exposing the drain electrodes 175 and the end portions 179 of the data lines 171, respectively. The end portion 179 of each data line 171 may be wider than the remainder of the data line 171, and thus may alternatively be termed "expansions" 179.

A plurality of pixel electrodes 190 and a plurality of contact assistants 82 which are made of, for example, ITO or IZO, are formed on the passivation layer 180.

The pixel electrodes 190 are physically and electrically connected to the drain electrodes 175 through the contact holes 185 such that the pixel electrodes 190 receive the data voltages from the drain electrodes 175.

The pixel electrodes 190 receive data voltages to produce electric fields along with a common electrode 270 formed on the lower panel 200 and receiving common voltage. The electric fields formed between the pixel electrodes 190 and the common electrode 270 rearrange liquid crystal molecules therebetween.

The pixel electrode 190 and the common electrode 270 form a liquid crystal capacitor to preserve applied voltage after turning off the thin film transistor. A storage capacitor connected to the liquid crystal capacitor in parallel is formed to enhance the capability of preserving a pixel voltage. The storage capacitor may be formed by overlapping the pixel electrode 190 and the storage electrode line 133a or by overlapping the pixel electrode 190 and a previous gate line 121.

When the passivation layer 180 is made of a low dielectric material, the pixel electrode 190 may be formed to overlap the gate lines 121 and the data lines 171 to increase the aperture ratio.

The contact assistants 82 are connected to the exposed end portions 179 of the data lines 171 through the contact holes 182. While the contact assistants 82 protect the exposed end portions 179 and complement the adhesion between the exposed end portions 179 and external devices, they may alternatively be omitted.

An alignment layer 11 is formed on the pixel electrode 190 and is rubbed in a direction to align the LC.

An LCD is achieved by injection of LC in the gap between the upper and lower panels 100 and 200 after aligning and assembling the upper and lower panels 100 and 200.

In the embodiments disclosed herein, since the color filters 230R, 230G, and 230B are formed on the lower panel 200, there is no possibility that the second light L2 passes different color filters on the way of coming into the reflection layer 218a and going out after reflection. For example, when the second light L2 comes into the reflection layer 218a through the green color filter 230G, then the second light L2 goes out through the same green color filter 230G. Accordingly, the trans-reflective LCD device 510 shows an improved display quality.

Furthermore, the phase retardation of light in the transmission area TA and the reflection area RA can be adjusted to be the same by controlling the thickness of the overcoating layer 250. Accordingly, a trans-reflective type LCD which has no phase difference between the first light L1 and the second light L2 can be made without phase shifting films.

Figure 3:
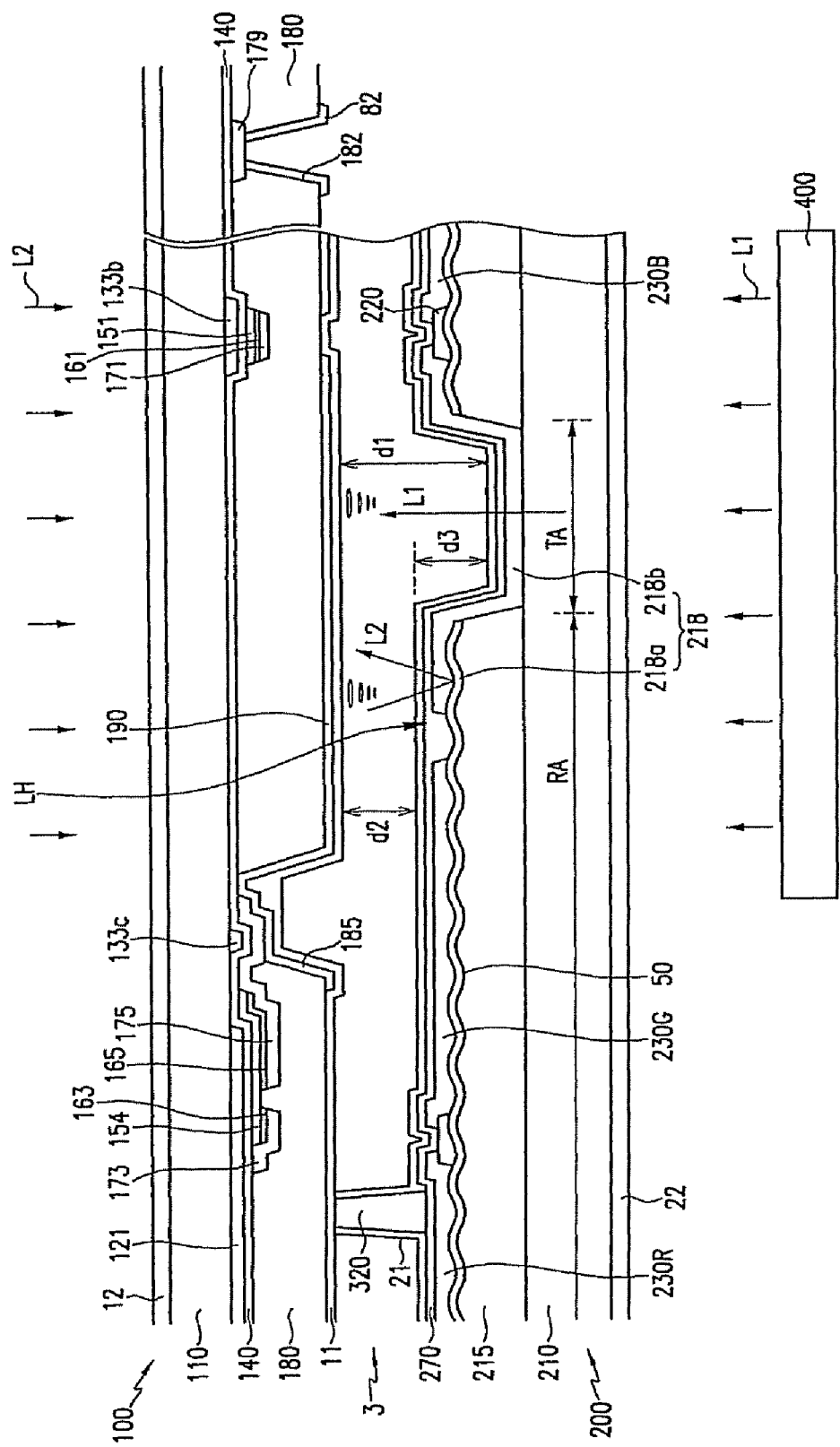
FIG. 3 is a sectional view of the trans-reflective LCD device according to another embodiment of the present invention taken along line II-II' and line II'-II" of FIG. 1.

FIG. 3 is a sectional view of the trans-reflective LCD device according to another embodiment of the present invention taken along line II-II' and line II'-II" of FIG. 1. Hereinafter, a same reference numeral represents the same element having the same function with the former drawings.

Referring to FIG. 3, the lower panel 200 includes a lower substrate 210 made of glass or the like and an organic layer 215 formed on the lower substrate 210. Here, the organic layer (diffuser layer) 215 has a surface of embossing 50 that may be formed by a single photolithography process to disperse direction of reflected light.

The portion corresponding to the transmission area TA of the organic layer 215 may have a thinner width than the portion corresponding to the reflection area RA. The portion corresponding to the transmission area TA may also be omitted.

For example, the thickness d3 of the organic layer 215 corresponding to the reflection area RA is about 1.5 times to about 2.5 times thicker than that of the portion of the organic layer 215 corresponding to the transmission area TA. Alternatively, the organic layer 215 may be completely removed from the transmission area TA, and therefore may have a thickness of zero, such as zero mm. Accordingly, the cell gap d2 of the reflection area RA is smaller than the cell gap d1 of the transmission area TA.

A trans-reflection layer 218 is formed on the organic layer 215. The embossing 50 of the organic layer 215 is transcribed to a reflection layer 218a of the trans-reflection layer 218 to disperse direction of reflected light.

The trans-reflection layer 218 includes the reflection layer 218a made of a reflective material and reflecting the second light L2 coming from the front of the upper panel 100 and a transmission layer 218b transmitting the first light L1. The reflection layer 218a is made of a metal such as Cr or Al. Here, the lower panel 200 includes a reflection area RA corresponding to the reflection layer 218a and a transmission area TA corresponding to the transmission layer 218b. It should be understood that the transmission layer 218b corresponds to the portion of the organic layer 215 that is smaller in width than the portion of the organic layer 215 residing in the reflection area RA.

A light blocking member 220 is formed on the trans-reflective layer 218 to prevent light leakage. The light blocking member 220 has a plurality of openings corresponding to the pixel electrodes 190 and has a similar shape as the pixel electrodes 190. The light blocking member 220 includes portions corresponding to the thin film transistors and may have a shape of stripes along the data lines 171.

The light blocking member 220 may be a Cr single layer, Cr and $CrO_2$ double layers, an organic layer including black pigments, etc.

Red, green, and blue color filters 230R, 230G, and 230B are formed on the trans-reflective layer 218. The color filters 230R, 230G, and 230B correspond to the pixel electrodes 190 and have shapes of stripes stretching in the longitudinal direction, such as parallel to the data lines 171 and the semiconductor stripes 151. Each of the color filters 230R, 230G, and 230B expresses a primary color among red, green, and blue. Boundaries of the color filters 230R, 230G, and 230B are disposed on the gate lines 121 or the data lines 171. The light blocking member 220 is disposed to correspond to the boundaries of the color filters 230R, 230G, and 230B for preventing color mixing between two adjacent pixels to enhance reproduction of color.

The color filters 230R, 230G, and 230B are disposed on the reflection layer 218a in the reflection area RA but are in contact with the lower substrate 210 in the transmission area TA.

A common electrode 270 made of a transparent conductor such as, but not limited to, Indium tin oxide (ITO) or Indium zinc oxide (IZO) is formed on the color filters 230R, 230G, and 230B and the light blocking member 220.

An alignment layer 21 is formed on the common electrode layer 270 and is rubbed in a direction to align the LC.

Since the reflection layer 218a is not formed in the transmission area TA, the first light L1 from the back light 400 transmits through the transmission area TA to display images. That is, the first light L1 emitted from the back light 400 passes through the LC layer 3 and color filters 230R, 230G, and 230B just once to display images.

On the contrary, the first light L1 from the back light 400 does not enter into the LC layer 3 within the reflection area RA because the reflection layer 218a reflects the first light L1. However, the second light L2 coming from the exterior through the upper panel 100 is reflected back to the front side of the upper panel 100 to display images. In the reflection area RA, the second light L2 passes the color filters 230R, 230G, and 230B and the LC layer 3 twice, that is, both coming into the LC panel 350 and going out of the LC panel 350. Accordingly, the second light L2 leaving the reflection area RA experiences phase retardation since it has passed through the LC layer 3 twice and sometimes experiences inversion of phase at the reflection layer 218a.

As described above, since the organic layer 215 is removed at the portion corresponding to the transmission area TA, the cell gap d2 of the reflection area RA is smaller than the cell gap d1 of the transmission area TA. The phase retardation of light in the transmission area TA and the reflection area RA can be adjusted to be the same by controlling the thickness of the organic layer 215. By the above method, an LCD having uniform color reproduction in both the areas TA and RA can be made.

Accordingly, a trans-reflective type LCD which has no phase difference between the first light L1 and the second light L2 can be made without phase shifting films.

Column spacers 320 are formed on the common electrode 270 for uniform cell gap between portions of the upper panel 100 and the lower panel 200. Alternatively, the column spacers 320 may be formed on the pixel electrodes 190 of the upper panel 100. The column spacers 320 may be formed to correspond to the thin film transistor. The number of column spacers 320 may be adjusted according to the size of the LCD device.

The LCD device according to the embodiment of FIG. 3 is manufactured by a simpler process than the LCD device according to the embodiment of FIG. 1. A manufacturing method of the LCD device according to the embodiment of FIG. 3 will be described.

FIGS. 4 to 7 illustrate sectional views of the trans-reflective LCD shown in FIG. 3 during a manufacturing process of the trans-reflective LCD.

Figure 4:
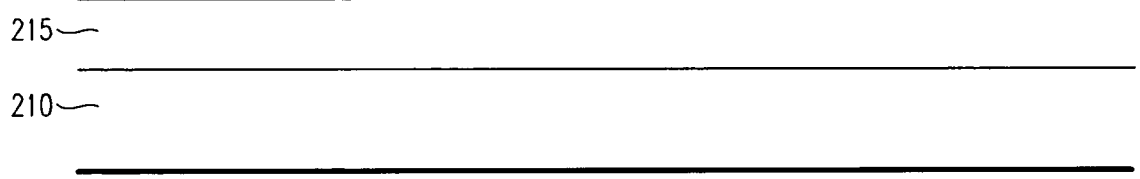
FIGS. 4 to 7 illustrate sectional views of the trans-reflective LCD device shown in FIG. 3 in a process of manufacturing the trans-reflective LCD device.
Figure 5:
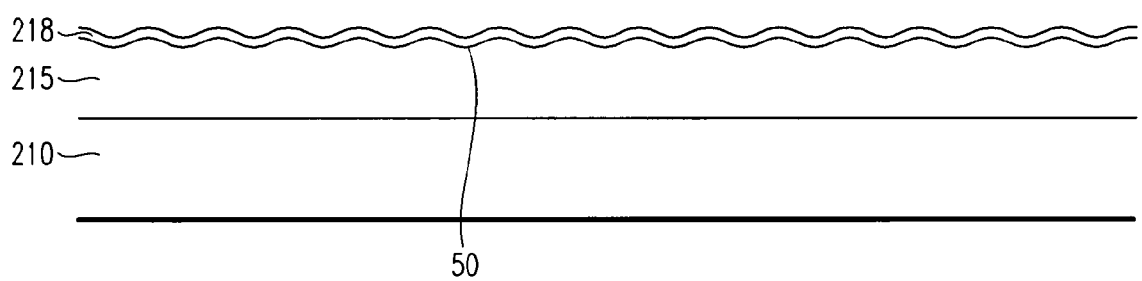

Referring to FIG. 4, the organic layer 215 is formed on the insulating substrate 210. Referring to FIG. 5, the embossing 50 is formed in the surface of the organic layer 215 by photolithography. Then, the reflection layer 218 is formed on the embossed organic layer 215 with a metal such as, but not limited to, Cr or Al.

Figure 6:
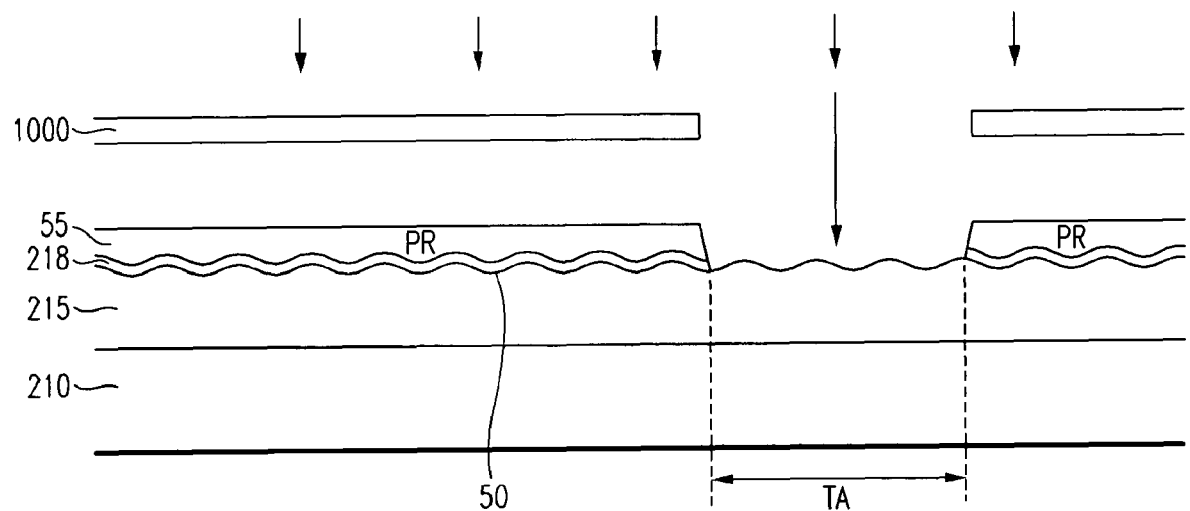

Referring to FIG. 6, portions of the reflection layer 218, which are corresponding to transmission area TA, are removed, such as by a photo-etching process by using a photoresist layer 55 and a photo-mask 1000. The organic layer 215 is exposed through the removed portions of the reflection layer 218.

Figure 7:
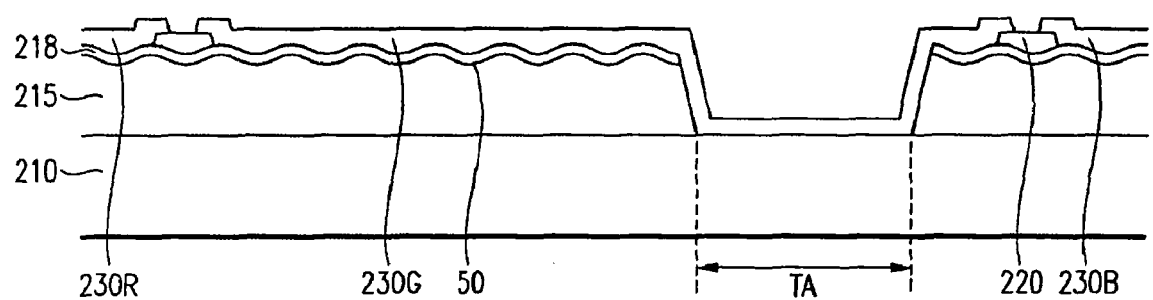

Referring to FIG. 7, the exposed portions of the organic layer 215 are removed to expose the insulating substrate 210.

As described above, a step profile of the organic layer 215 is formed by simultaneous patterning of the organic layer 215 and the reflection layer 218. Accordingly, an LCD having multi cell gap is manufactured without using additional photo-etching process for forming the step profile of the organic layer 215. As a result, the manufacturing method of LCD having multi cell gap is simplified. Additionally, the LCD does not need an overcoating layer.

A light blocking layer made of a material having good light blocking characteristics, such as Cr, is deposited on the reflection layer 218 and is photo-etched to form a light blocking member 220. The red, green, and blue color filters 230R, 230G, and 230B are formed on the light blocking layer. The color filters 230R, 230G, and 230B are disposed on both of the transmission area TA and the reflection area RA.

As previously shown in FIG. 3, the common electrode 270 made of a transparent conductor such as Indium tin oxide (ITO) or Indium zinc oxide (IZO) is formed on the color filters 230R, 230G, and 230B and the light blocking layer 220.

In an alternate embodiment of the present invention, the trans-reflection layer 218 is formed on the color filter panel that includes the color filters 230R, 230G, and 230B. The color filter panel is disposed as a lower panel and the thin film transistor array panel is disposed as an upper panel. This trans-reflective LCD structure allows manufacturing a trans-reflective LCD with using the same number of manufacturing steps with a transmission type LCD.

In an embodiment of the present invention, since the overcoating layer 250 formed on the trans-reflection layer 218 of the lower panel 200 has different thicknesses between the transmission area TA and the reflection area RA, a trans-reflective type LCD which has no phase difference between the transmission area TA and the reflection area RA without phase shifting films can advantageously be made. Production cost is lowered by omitting phase shifting films.

Since the color filters 230R, 230G, and 230B are formed on the lower panel 200, it is not possible for light to pass different color filters while entering the reflection layer 218a and exiting after reflection. Accordingly, the trans-reflective LCD according to an embodiment of the present invention shows an improved display quality.

In another embodiment of the present invention, a step profile of the organic layer is formed by simultaneous patterning of the organic layer and the reflection layer. Accordingly, an LCD having multi cell gap is manufactured without using additional photo-etching process for forming the step profile of the organic layer. As a result, the manufacturing method of LCD having multi cell gap is simplified. Additionally, the LCD of this embodiment advantageously does not require an overcoating layer. In any of the above-described embodiments, a stepped layer, whether an overcoating layer or an organic layer, has a first thickness within the reflection area that is greater than a second thickness within the transmission area. In some embodiments, the second thickness may be zero.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A panel for an LCD device comprising:
    a substrate;
    an organic layer formed on the substrate;
    a trans-reflection layer formed on the organic layer, the organic layer being disposed between the substrate and the trans-reflection layer, and the trans-reflection layer having a reflection area reflecting a portion of incidence light from an exterior of the panel and a transmission area transmitting another portion of the incidence light, wherein using a single mask in the forming of the trans-reflection layer completely forms the reflection area and the transmission area;
    a light blocking member formed on, and in a different layer than, the trans-reflection layer;
    color filters formed on the trans-reflection layer and the light blocking member, and contacting the organic layer; and
    a common electrode formed on the color filters, and contacting the trans-reflection layer and the light blocking member,
    wherein a thickness of a portion of the organic layer corresponding to the reflection area is greater than that of a portion of the organic layer corresponding to the transmission area, and
    wherein the trans-reflection layer has an embossed surface in the reflection area.

2. The panel for an LCD device of claim 1, wherein the organic layer is disposed on the substrate at least within an area corresponding to the reflection area.

3. The panel for an LCD device of claim 1, wherein the trans-reflection layer is made of aluminum or chromium.

4. The panel for an LCD device of claim 1, wherein the organic layer has an embossed surface.

5. The panel for an LCD device of claim 1, wherein the color filters have light holes.

6. An LCD device comprising:
- a first panel including:
  - a first substrate;
  - an organic layer formed on the first substrate;
  - a trans-reflection layer formed on the organic layer, the organic layer being disposed between the first substrate and the trans-reflection layer, and the trans-reflection layer having a reflection area reflecting a portion of incidence light from an exterior of the first panel and a transmission area transmitting another portion of the incidence light,
  - wherein the reflection area and the transmission area are completely formed by using a single mask during the forming of the trans-reflection layer, and the trans-reflection layer has an embossed surface in the reflection area;
  - a light blocking member formed on, and in a different layer than, the trans-reflection layer;
  - color filters formed on the trans-reflection layer and the light blocking member, and contacting the organic layer; and
  - a common electrode formed on the color filters, and contacting the trans-reflection layer and the light blocking member;
- a second panel including:
  - a second substrate facing the first substrate;
  - a plurality of thin film transistors formed on the second substrate; and
  - a plurality of pixel electrodes connected to the thin film transistors,
  - wherein the second panel is separated from the first panel by a selected gap; and
- a liquid crystal layer disposed between the first panel and the second panel,
- wherein a thickness of a portion of the organic layer corresponding to the reflection area is greater than that of a portion of the organic layer corresponding to the transmission area.

7. The LCD device of claim 6, wherein the organic layer is disposed on the first substrate at least within an area corresponding to the reflection area.

8. The LCD device of claim 7, wherein the gap within the transmission area is larger than that within the reflection area.

9. A panel for an LCD device comprising:
- a reflection area reflecting within the panel a portion of incidence light from an exterior of the panel;
- a transmission area for transmitting through the panel another portion of the incidence light;
- a trans-reflection layer including a reflection layer within the reflection area of the panel, the reflection layer reflecting the incidence light passing through the reflection area having an embossed surface;
- a substrate;
- an organic layer disposed between the substrate and the trans-reflective layer;
- a stepped layer on the substrate, the stepped layer allowing the passage of the incidence light therethrough;
- a light blocking member formed on, and in a different layer than, the trans-reflection layer;
- a color filter layer disposed on the trans-reflection layer and the light blocking member, and contacting the organic layer; and
- a common electrode formed on the color filter layer, and contacting the trans-reflection layer and the light blocking member;
- wherein the stepped layer has a first thickness within the reflection area, and a second thickness within the transmission area, and wherein the first thickness is greater than the second thickness; and
- wherein a single mask directly forms the reflection area and the transmission area when the panel is formed.

10. The panel of claim 9, wherein the stepped layer is the organic layer formed on the substrate, and wherein the trans-reflection layer is formed on the organic layer.

11. The panel of claim 10, wherein the organic layer includes an embossed surface for receiving the trans-reflection layer.

12. The panel of claim 9, wherein the second thickness of the stepped layer is zero mm.

13. The panel of claim 9, wherein the stepped layer is an overcoating layer formed upon the color filter layer on the trans-reflective layer.

* * * * *